Patented June 6, 1939

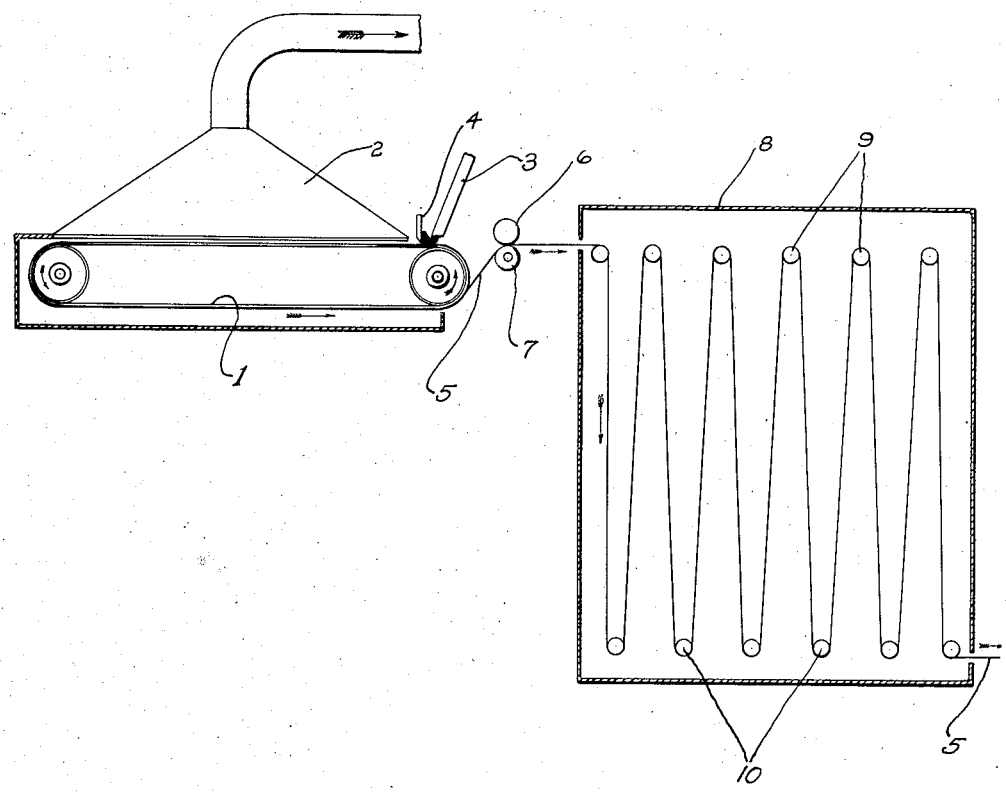

2,161,454

UNITED STATES PATENT OFFICE 2,161,454

METHOD OF PRODUCING RUBBER HYDROCHLORIDE FILMS

William C. Calvert, Chicago, Ill., assignor to Wingfoot Corporation, Wilmington, Del., a corporation of Delaware Application September 23, 1936, Serial No. 102,225

6 Claims. (Cl. 18—57)

This invention relates to films of rubber hydrochloride. It includes both the films and the method of making them.

In the manufacture of a film of rubber hydrochloride it was found that the film formed by mere evaporation of solvent from a solution of the film material was not as clearly transparent as desirable. It has now been found that the transparency can be materially improved by a simple processing step.

According to this invention a solution of the film material in a volatile solvent is spread on a suitable surface and after evaporation of solvent from the exposed surface this surface is subjected to a "smoothing out" operation. This smoothing out is preferably effected while the film still contains a small amount of solvent and then the balance of the solvent is evaporated.

The film may advantageously contain between 5 and 15% by weight of solvent when subjected to the smoothing out operation to remove irregularities from the surface. For example, to produce a film of high transparency from rubber hydrochloride a solution of 7% of a partially saturated rubber hydrochloride (for example, rubber hydrochloride containing 29–30.5% chlorine) dissolved in benzene is spread out as a thin film on an endless smooth surfaced belt in such a way as to produce a continuous film. The benzene is allowed to evaporate, preferably with a forced draft, until its solvent content has been reduced to about 5 to 15% of the weight of the rubber hydrochloride. It is then passed between highly polished pressure rolls. This removes irregularities in the surface of the film from which the benzene has been volatilized. The film is then subjected to further drying to allow evaporation of the balance of the solvent. The highly polished rolls may if desired contain some marking or design to impress or emboss a figure or design upon the film, but the major portion of the rolls will be smooth and highly polished. A minimum temperature of about 150° F. is advantageously employed and for usual operating conditions 190° or 200° F. is preferred.

Various methods of smoothing out the film surface may be employed. For example, pressure may be applied to the film before it is removed from the surface on which it is formed as by applying pressure to the film before it is removed from the endless belt. If rollers are employed for smoothing out the surface of the film it may be advantageous to use a rubber covered roll or a hard rubber roll in combination with a steel roll, with the steel roll contacting with the surface of the film from which solvent has been evaporated, because of the difficulty in obtaining two steel rolls with surfaces of the exact uniformity required to calender a film with a thickness of the order of a thousandth of an inch. By using a roll with a resilient surface in combination with a steel roll any deviations from uniformity in the surface of the steel roll are compensated by the resilient roll and uniform pressure on the film is obtained.

The invention is illustrated diagrammatically in the accompanying drawing. The coated belt is indicated by numeral 1. The hood 2 is provided to carry off vapors of the solvent from the chamber enclosing the film. The solution of rubber hydrochloride is fed onto the belt through suitable means attached to the feed pipe 3. A spreader of scraper to regulate the thickness of the film is indicated at 4. The film 5 after the majority of the solvent has been evaporated is passed through the pressure rolls 6 and 7. The roll 6 is a steel roll. The roll 7 is preferably covered with rubber or other resilient material. The upper surface of the film from which solvent has evaporated contacts with the pressure roll 6. It is somewhat irregular as the film enters between the rolls 6 and 7, but the highly polished surface of the roll 6 smooths out irregularities present in the surface of the partially formed film. From these rolls the film passes through further drying means of suitable design here indicated by the drier 8 in which the film is festooned over rollers 9 and 10. Here air circulation means (not shown) removes the balance of the solvent through suitable vents (not shown).

The rubber hydrochloride may be made in any suitable way, such for example as that described in my issued Patent 1,989,632. It may advantageously contain a stabilizer such as those there mentioned. For example, it may contain about one per cent of hexamethylene tetramine. Films of any thickness may be prepared, which may be .005 to .002 inch thick, or thinner or thicker as described in said patent.

This application is in part a continuation of my application Serial No. 2,843 filed January 22, 1935.

I claim:

1. The method of producing rubber hydrochloride film which comprises casting a thin film of a rubber hydrochloride cement, evaporating solvent from one surface of the cement film thus produced, thereby forming a film of reduced solvent content having irregularities in the surface from which solvent has been evaporated which irregularities reduce the transparency of the film, smoothing out said irregularities by pressure without substantial elongation of the film thereby increasing its transparency, and then evaporating the balance of the solvent.

2. The method of producing rubber hydrochloride film which comprises casting a thin film of a benzene cement of a rubber hydrochloride, evaporating benzene from one surface of the cement film thus produced thereby forming a film of reduced solvent content, smoothing out said surface by contact with a highly polished metal surface without substantial elongation of the film thereby increasing its transparency, and then evaporating the balance of the benzene.

3. The method of producing rubber hydrochloride film which comprises casting a thin film of a benzene cement of a rubber hydrochloride, evaporating solvent from one surface of the cement film thus formed to reduce the benzene content to 5–15% of the weight of the rubber hydrochloride thereby forming a film having irregularities in the surface from which the benzene is evaporated which irregularities reduce the transparency of the film, smoothing out said irregularities to increase the transparency of the film and without substantial elongation, by bringing said surface into contact with a highly polished surface while the film is passed over a resilient support, and then evaporating the balance of the benzene.

4. The method of producing rubber hydrochloride film which comprises casting a thin film of a rubber hydrochloride cement containing a small amount of hexamethylene tetramine, evaporating solvent from one surface of the cement film thus produced, thereby forming a film of reduced solvent content having irregularities in the surface from which solvent has been evaporated which irregularities reduce the transparency of the film, smoothing out said irregularities by pressure without substantial elongation of the film thereby increasing its transparency, and then evaporating the balance of the solvent.

5. The method of producing rubber hydrochloride film which comprises casting a thin film of a benzene cement of a rubber hydrochloride containing a small amount of hexamethylene tetramine, evaporating benzene from one surface of the cement film thus produced thereby forming a film of reduced solvent content, smoothing out said surface by contact with a highly polished metal surface without substantial elongation of the film thereby increasing its transparency, and then evaporating the balance of the benzene.

6. The method of producing rubber hydrochloride film which comprises casting a thin film of a benzene cement of a rubber hydrochloride containing a small amount of hexamethylene tetramine, evaporating solvent from one surface of the cement film thus formed to reduce the benzene content to 5–15% of the weight of the rubber hydrochloride thereby forming a film having irregularities in the surface from which the benzene is evaporated which irregularities reduce the transparency of the film, smoothing out said irregularities to increase the transparency of the film and without substantial elongation by bringing said surface into contact with a highly polished surface while the film is passed over a resilient support, and then evaporating the balance of the benzene.

WILLIAM C. CALVERT.